July 11, 1944.  M. J. REDLING  2,353,501
VEHICLE STEERING MECHANISM
Filed Oct. 30, 1943  2 Sheets-Sheet 1
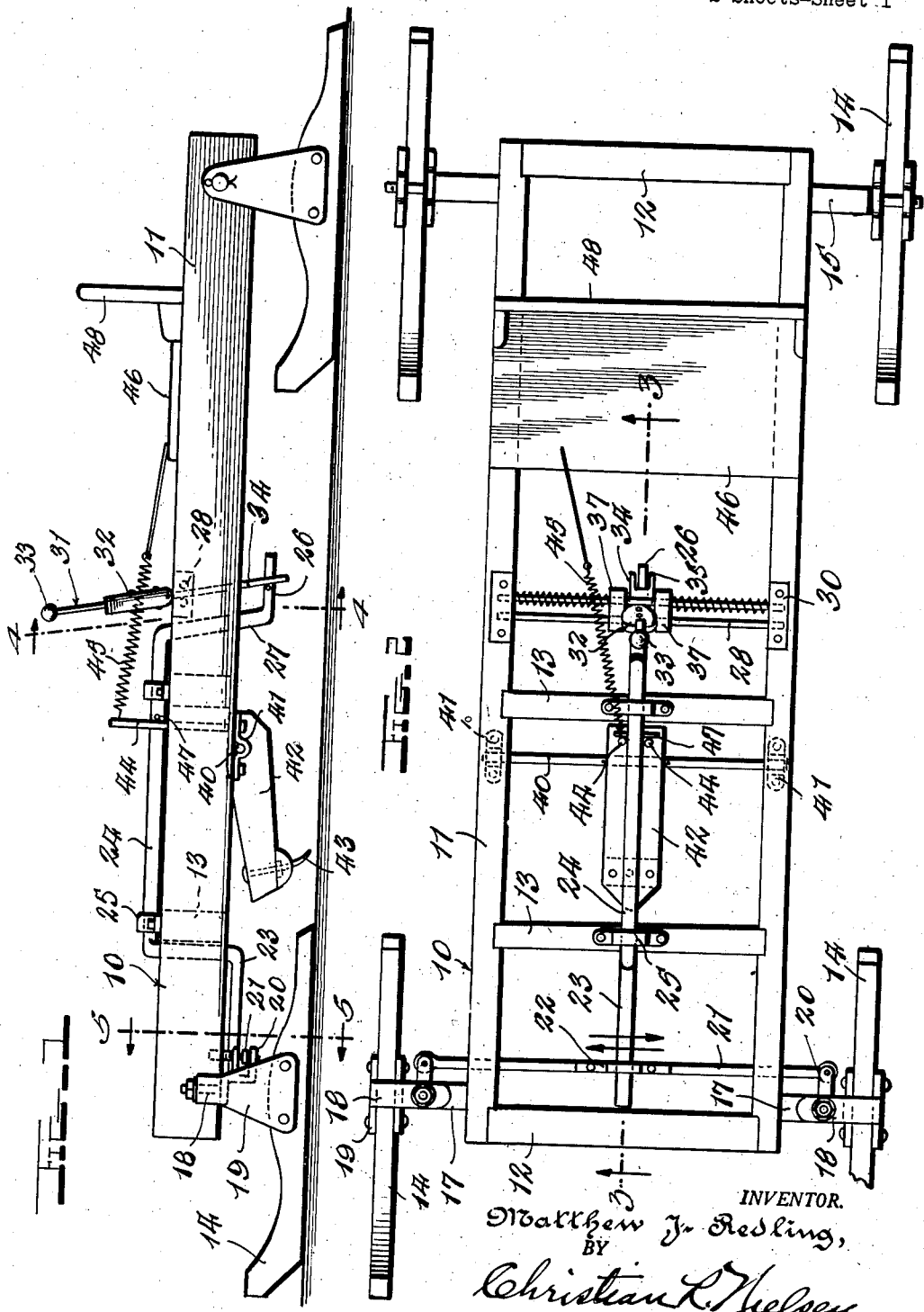
INVENTOR.
Matthew J. Redling,
BY
Christian L. Nielsen
ATTORNEY

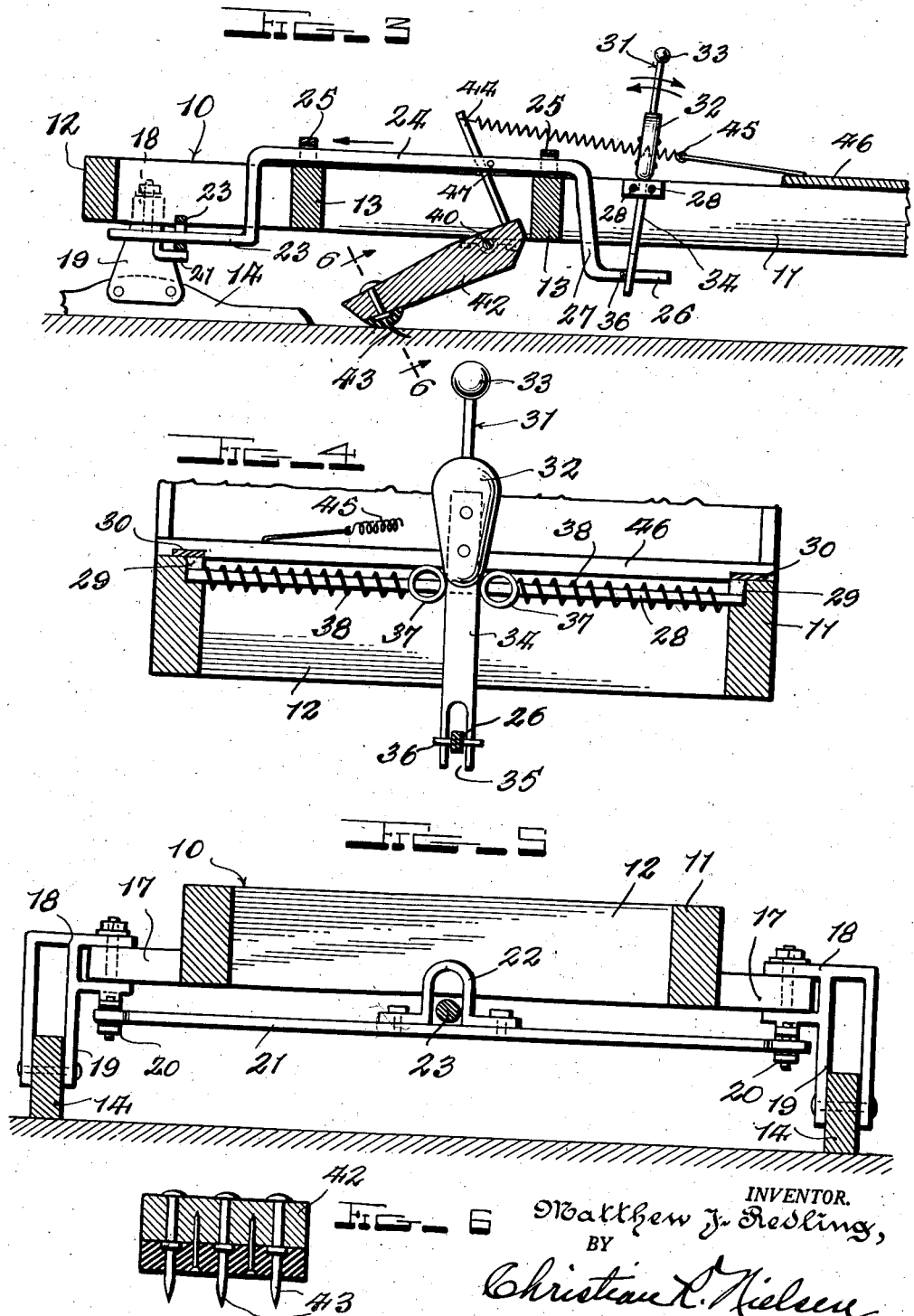

Patented July 11, 1944

2,353,501

UNITED STATES PATENT OFFICE 2,353,501

VEHICLE STEERING MECHANISM

Matthew J. Redling, Perth Amboy, N. J.

Application October 30, 1943, Serial No. 508,335

2 Claims. (Cl. 280—21)

The invention relates to novel and improved construction in steering and brake controls for coaster trucks, both of the wheeled and runner types, and it is a particular aim of the invention to present a simplified combined steering and braking control in a single hand-operated element, readily adapted to be operated by children.

Another important aim of the invention is to present a construction for these purposes which is adapted to be constructed at a low cost, and in a simple form adapted to have a serviceable performance with a minimum liability of derangement due to ordinary use, and one which will be rugged and liable in a minimum degree to wear or damage by rough usage.

A further aim of the invention is to provide a steering and brake control in which the operating means may consist of a single upstanding lever movable in one direction for operation of the brake, and in a direction at right angles thereto for steering effect, so that it will resemble the "control stick" of an aeroplane.

A further important aim of the invention is to provide a novel mounting of the main control lever whereby its functioning in steering will be highly efficient, and whereby also, at the same time, its utilization for operation of the brake may be availed of with high efficiency.

Another important aim of the invention is to provide a mounting of the control lever wherein it may have a large element of movement transverse to the steering movement sufficient for maximum braking effect, and whereby it may have a degree of movement in the direction of brake release beyond the normal connected relation, without operating the brake device, so that it may be kept out of the way of the occupant of a coaster, when getting into and out of a coaster, and whereby accidental weight thereon will not operate the brake device beyond normal release position, or involve damage to the lever by reason of pressure tending to move it beyond release position.

A very important aim of the invention is to provide a mounting for the lever whereby in steering movements, requirement for a pivot pin or other conventional pivotal connections is avoided, and the need for an expensive universal joint device is obviated in a novel way.

Additional objects, advantages and features of invention reside in the construction, arrangement and combination of parts involved in the embodiment of the invention, as will be more readily understood from the following description and accompanying drawings, wherein Figure 1 is a side elevation of a sled coaster constructed in accordance with my invention.

Figure 2 is a top view thereof.

Figure 3 is a fragmentary longitudinal sectional view on the line 3—3 of Figure 2.

Figure 4 is a cross sectional view on the line 4—4 of Figure 1.

Figure 5 is a similar cross section on the line 5—5 of Figure 1.

Figure 6 is a detail longitudinal section on the line 6—6 of Figure 3.

Referring to the drawings, there is illustrated a rectangular chassis frame 10, in the present instance comprising two side stringers 11 and end cross arms 12 connecting the two. Cross beams 13 are also mounted between the stringers spaced longitudinally of the chassis, and the foremost one is spaced rearwardly of the front cross member 12 a distance, as may be seen in Figure 2.

Rear runners 14 are rockingly mounted upon a cross axle 15, in a conventional way, and at the front of the device, brackets 17 are mounted on each side of the frame, projecting laterally therefrom, and having steering knuckles 18 pivoted thereon including an outwardly projecting part in which a combined runner-wheel yoke is included, as at 19, this having runners 14 mounted at the lower part thereof, in the present instance. The steering knuckles include rearwardly projecting steering arms 20, between which a conventional cross link type of connection 21 is connected, but this having in addition at its middle part, a strap bearing 22 at the upper side, in which a forward operating crank 23 of a longitudinal crank shaft 24 (to be described) is engaged. The strap 22 is looped over the crank 23 with sufficient height to accommodate the arcuate movement of the crank 23 properly.

The crank shaft 24 is made of a single bar of metal, having an intermediate rectilinear portion laid across the cross members 13 and secured by conventional strap bearings 25. In front of the forward beam 13 the shaft is bent downwardly in a vertical direction, normally close in front of the beam 13, which serves as a stop for rearward movement of the shaft, and at a distance below the frame 10, the shaft is bent at right angles forwardly parallel to the axis of the central shaft portion, forming the crank 23. This crank is of considerable length, and extends through the front bearing 22 and forwardly of the cross link 21 a distance, as may be seen in Figures 1 and 2. At a distance rearwardly of the rear cross beam 13, sufficient to permit forward reciprocation of the shaft 24, (for purposes hereinafter described) a second crank 26 is formed, the end portion of the shaft 24 being bent downwardly in a plane with the downwardly bent forward portion, and the lower end portion then bent to extend parallel to the axis of the body of the shaft 24 with a slightly greater radius than that of the crank 23 in the present instance.

A mounting for a control lever is provided, which consists of two transverse parallel, closely spaced rods 28, set in notches in the upper edges of the side stringers 11, as at 29, and held therein by retainer plates 30 secured upon the top sides of the stringers. A control lever 31 is provided, consisting of an intermediate thickened portion 32 above the bars 28, and of a thickness greater than the space between the bars in the present instance; an upper handle portion 33 set in the central part 32 rigidly, and a lower lever arm 34, set rigidly in the central part 32, and projected a distance below the frame 10, being slotted for a suitable distance at its lower end to receive the crank 26 therein as at 35, in Figure 4. A transverse pin 36 is also set crosswise in the crank 26, in front of the lever arm 34, so that rearward movement of the handle 33 will cause the arm 34 to press the pin and crank 26 forwardly, thus operating the crank shaft longitudinally, for purposes which will be explained. To provide for lateral pivotal movement of the lever, two cylindrical abutments are provided on each side of the lever, as at 37, these cylindrical members extending longitudinally, being transversely apertured to receive the rods 28 slidably therethrough. They are pressed toward the lever 31 by means of helical springs 38, confined between respective stringers 11 of the frame, and adjacent abutments 37, so as to press the abutments firmly against the sides of the lever 31 below the thickened parts 32. The lower end of this part 32 is rounded in all directions, so that the lever may be readily oscillated laterally between the abutments 37, or longitudinally between the rods 28. Under transverse oscillation of the lever, its lower end portion will engage and swing the crank 26 in respective directions, and by this oscillation of the shaft 24 the forward crank 23 will operate the cross link and effect steering of the vehicle, as will be readily understood, by reason of the connections with the steering knuckles.

Immediately in front of the rear cross member 13, a transverse shaft 40 is mounted at the lower edge of the stringers 11, in conventional strap bearings 41, and on this shaft at an intermediate point, a brake arm 42 is mounted for pivotal movement upon the axis of the shaft. This arm extends forwardly from the shaft and is provided with ground-engaging spikes 43 or other brake device for engaging the ground surface as shown. The arm 42 is provided with an upstanding rigidly connected arm 44, extending upwardly slightly above the frame 10, and having connected to its upper end a retractile spring 45, which is extended rearwardly and secured in the present instance to a seat board 46 secured across the top edges of the stringers 11. In the present instance, there are two of the arms 44, one on each side of the shaft 24 and set closely thereagainst, by which means the brake member is held centrally located beneath the chassis. Immediately behind the upstanding arms 44 of the brake, and serving as a stop for release movement of the brake, there is a transverse pin 47 set in the shaft 24 against which the arms are caused to press by the spring 45. In this manner the shaft 24 is yieldingly held at its rear limit of movement, stopped by engagement of the forward crank arm against the forward cross member 13.

When the lever 31 is drawn rearwardly at its upper part, causing the crank shaft to be pressed forwardly, the pin 47 operating the arms 44 will depress the forward end of the brake member 42 and engage the spikes 43 with the ground surface, thereby braking the movement of the coaster.

The seat 46 may be provided with a conventional back 48, and if desired, additional seats may be mounted upon the chassis of the forward part, there being room for at least one.

It will be understood that if desired the spring 45 in the present instance illustrated for convenience as being located above the frame 10 and connected between the seat 46 and the upstanding arm 44 on one side of the brake arm 42, may be located elsewhere in proper relation to the brake device to hold it in retracted position yieldingly, it being possible to so locate the spring so that it will be more out of the way than as shown.

In the operation of this device, a person seated upon the rear seat 46 may grasp the handle of the lever 31, and by drawing it rearwardly, cause the lower lever arm 34 to press the shaft 24 forwardly, thus bringing the pin 47 into engagement with the arms 44 by which the brake member is depressed. Either before, during, or after such operation of the brake, the lever 31 may be moved laterally in one direction or the other, to effect steering of the truck, these movements oscillating the shaft 24 in respective directions so that the crank 23 wipes against the sides of the strap bearings 22, moving the cross link and with it the two steering arms 20, thus turning the runners 14 or wheels, as the case may be, for steering of the vehicle.

While I have disclosed the details of my invention in the best form known to me, with great particularity, it will nevertheless be understood that this is purely exemplary, and that modifications in the construction, arrangement and combination of parts, substitution of materials, and substitution of equivalents may be made without departing from the spirit of the invention, except as may be more specifically limited by the appended claims.

If desired, the control lever may be duplicated at the forward part of the vehicle, as indicated above, so that either or both controls may be used simultaneously, thus simulating dual controls of airplanes.

The control described has the advantage that the brake may be applied at the same time that the steering function is utilized. In this way braking at the same time that the vehicle is making a turn will tend to prevent upsets and other accidents. The universal pivotal movement of the lever 31 attained in my invention is an advantage in the safe operation of coasters equipped therewith.

I claim:

1. A steering and brake apparatus for vehicles of the character described, comprising steering members including a transversely reciprocable cross link, and a brake device including a longitudinally movable arm, a crank shaft slidably mounted upon the vehicle extending longitudinally thereof, and having a forward crank extended downwardly therefrom and horizontally forward, in sliding engagement with the cross link, said longitudinally movable arm of the brake device being close beside said shaft, a lateral projection on the shaft in the path of movement of said arm, yielding means engaged with the arm to hold it yieldingly in inoperative position and against said projection, a universally pivoted lever having its pivot adjacent the axis of said crank shaft, rearwardly thereof, said crank shaft having a rear crank thereon located therebelow, the lower end of said lever being pivotally connected to said crank, whereby to permit relative longitudinal movement of the crank shaft, for the purposes described.

2. A mounting for a control lever of the character described, comprising a vehicle frame, transverse closely spaced parallel pins thereon, said lever having a thickened intermediate part and a narrow downwardly projected arm engaged between said rods whereby the thickened part may rest upon the rods for oscillation of the lever, lateral abutments slidingly engaged upon said rods at each side of the lever and in supporting relation to said thickened portion, and yielding means for holding said abutments in engagement with the sides of the lever.

MATTHEW J. REDLING.